Dec. 8, 1942.    G. R. ANDERSON    2,304,067
PRODUCTION OF ROTORS FOR ELECTRIC MACHINES
Filed July 29, 1940    5 Sheets-Sheet 1

INVENTOR.
GORDON R. ANDERSON
ATTORNEY.

Dec. 8, 1942.   G. R. ANDERSON   2,304,067
PRODUCTION OF ROTORS FOR ELECTRIC MACHINES
Filed July 29, 1940   5 Sheets-Sheet 2

INVENTOR.
GORDON R. ANDERSON
BY
Paul L. Keohn
ATTORNEY.

Dec. 8, 1942.  G. R. ANDERSON  2,304,067
PRODUCTION OF ROTORS FOR ELECTRIC MACHINES
Filed July 29, 1940  5 Sheets-Sheet 3

FIG. 8.

INVENTOR.
GORDON R. ANDERSON
BY Paul L. Kisker
ATTORNEY.

Dec. 8, 1942.   G. R. ANDERSON   2,304,067
PRODUCTION OF ROTORS FOR ELECTRIC MACHINES
Filed July 29, 1940   5 Sheets-Sheet 4

INVENTOR.
GORDON R. ANDERSON
BY
Paul L. Keeler
ATTORNEY.

Dec. 8, 1942.    G. R. ANDERSON    2,304,067
PRODUCTION OF ROTORS FOR ELECTRIC MACHINES
Filed July 29, 1940    5 Sheets-Sheet 5

INVENTOR.
GORDON R. ANDERSON
BY
Paul L. Koehn
ATTORNEY.

Patented Dec. 8, 1942

2,304,067

UNITED STATES PATENT OFFICE 2,304,067

PRODUCTION OF ROTORS FOR ELECTRIC MACHINES

Gordon R. Anderson, Beloit, Wis., assignor to Fairbanks, Morse & Co., Chicago, Ill., a corporation of Illinois Application July 29, 1940, Serial No. 348,093

25 Claims. (Cl. 22—65)

This invention relates to rotors for electrical machines, and more particularly to a rotor member characterized by integrally formed conductor bars and end rings constituted of substantially pure copper; the physical integration of the bars and end rings, or squirrel cage structure, being attained by a centrifugal casting operation.

For a number of years past, various attempts have been made both in the laboratory and commercial practice of some of the larger producers of electrical machines, to attain a rotor having relatively rigid copper windings, all of such construction that the bars and end rings are formed as an absolutely integral unit, as by casting. It is of course difficult to attain uniform conductivity of the copper elements of a rotor structure of this type, by separately forming and thereafter welding or otherwise metallically joining the end rings and the bars. Accordingly, the most desirable structures are those in which the copper elements are all cast initially as a single unit. The desiderata of all such processes is two-fold, viz., first and most important, a uniform conductivity throughout the copper elements, and secondly, a uniform physical structure, avoiding bottlenecks, i. e., portions of restricted or reduced sectional area which adversely affect conductivity, and a physical structure such that the copper elements are internally and externally homogeneous.

It is generally known in the art that cast copper rotors as such, have been produced more or less sporadically, but without any marked commercial success, over a period of a number of years. It is however equally known that none of these products has attained a commercially desirable uniformity, either of conductivity or physical structure. Such a result was not believed possible prior to the development of the process and equipment herein to be described as characterizing the present invention. This is true in part, since there was not available, until quite recently, certain of the apparatus necessary to produce a physically and electrically uniform product of this kind, nor was there available, within a range of permissive costs, copper of an initial purity to result in a rotor embodying finished cast elements of such purity as to result, not only in a high, but dependably uniform conductivity.

However, irrespective of the availability of the raw materials and development of suitable casting equipment, the developments resulting in the present process and evolved over a period of several years intensive experiment, have resulted in the evolution of a complete casting technique, residing in a combination of steps of processes which have been found to enable the commercial production of centrifugal cast rotors of the noted types, which for the first time, exhibit a satisfactory degree and uniformity of electrical conductivity, as well as the requisite physical characteristics.

In partial explanation of some of the points probably accounting for the commercial shortcomings of centrifugally cast copper rotors heretofore offered to the trade, it may be noted that only relatively recently was there available as a metal for molding, as well as containing the copper elements during spinning at high temperature, materials which would successfully withstand the chemical and mechanical effects due to alloying, oxidation and attrition incident to any appreciable number of separate casting operations. This result has now been attained in a mold structure forming a part of the present broad program of development. Reference is made to the mold, merely as one example of improvement in materials available for practicing the process. It is further pointed out that the metal constituting the mold is desirably a non-magnetic product, and one which undergoes no material impairment of physical strength at high temperatures, yet a material which can be machined and formed within permissive cost ranges. The metal of the mold parts must also exhibit such density and other physical characteristics that the molten copper will not tend unduly to pick up ferrous or other contaminating impurities either by direct mechanical action or due to any surface alloying effect. The foregoing discussion of mold requirements is herein mentioned solely by way of an example to illustrate one of the numerous obstacles heretofore precluding the successful commercial casting of copper, for the purpose noted, and by centrifugal methods. It may be noted further that molds of so-called refractory material scarcely exhibit the requisite physical strength to withstand the stresses set up due to spinning of the mold and contents, hence the desirability of a metal structure of more than ordinary strength and thermal resistance.

It is by reason of a lack of requisite casting materials in part, and also due in part to a lack of a casting process suitable for the purpose, that there has resulted the earlier failure of any noteworthy success in the centrifugally cast rotors heretofore offered to the trade. Broadly stated, the difficulties heretofore presented were traceable in part to a lack of raw copper of sufficiently dependable purity, or one characterized by not only a low percentage of impurities, but by the absence of impurities of a nature adversely affecting conductivity of the finished cast elements. Secondly, but perhaps of equal importance, is mentioned as one of the keys of the successful commercial practice of the present process, a series of carefully conducted production steps, such that there is prevented any appreciable contamination of the copper at any stage in the casting process, from its first melting, through to the finished cast rotor.

Accordingly an object of the invention is the construction of a rotor having the conductor bars and end rings formed of copper and centrifugally cast in place according to an improved method, whereby to produce an improved type of integral rotor structure.

It is an additional object of the invention to employ as the conductive metal comprising the bars and end rings in a rotor of the noted type, substantially pure or electrolytic copper for the purpose of obtaining a rotor having a highly conductive, low loss characteristic.

Yet a further object of the invention may be found in the method for centrifugally casting a pure copper rotor wherein the rotor core and mold therefor are pre-heated to a selective predetermined temperature which is coordinated with a higher pouring temperature of the molten copper, such that the fluidity of the copper is retained for the duration of the casting operation.

Another object of the invention resides in the provision for counteracting the affinity of copper for ferrous metals, when such metals are brought into contact while at elevated temperatures, by the application of a refractory material, in the form of an aqueous suspension, to the surfaces of the ferrous metal which are exposed to the molten copper, to provide an insulating shield therefor capable of withstanding the high temperatures involved in working with molten copper.

Still a further object of the invention contemplates the use of a suitable refractory material as an insulating medium for the purpose expressed hereinbefore, and for the further purpose of obtaining an electrical insulating film on the rotor core structure, between the magnetic core and the copper, resulting in greatly improved electrical characteristics of the finished motor.

A further object of the invention resides in the application of a thin film or coating of a refractory material to the core structure of the rotor, and to the surfaces of the casting mold therefor, so that the refractory material may assist in maintaining the requisite fluidity of the copper during the casting operation, and so that the rotor bars and end rings as cast, will be of improved and uniform physical and electrical characteristics.

An additional object of the invention is attained in certain improved production apparatus and equipment having particular value, either directly or indirectly, in connection with the improved process of casting of rotors of the type heretofore referred to.

Still another object of the invention is attained in the improved physical arrangement of certain of the items of production equipment, including those which of themselves, have been developed or improved to best advantage for the casting process.

Although appearing to best advantage in conjunction with other features of the production equipment, an important objective of the present invention is attained in a rotatable support for the mold and contents, which presents certain marked improvements over earlier known centrifugal casting apparatus, and which is susceptible of use with or without certain of the other items of production equipment; in the broader sense, the spinning or centrifugal apparatus includes a number of refinements such as mold-locking or holding provisions, safety features, and facilities for effecting a bodily or translatory movement of the mold and contents.

Further objects and advantages will be in part implied from, and partly pointed out in the following description of a preferred embodiment of the present invention when taken in connection with the accompanying drawings, in which:

The desirability of employing pure copper in the construction of electric motor rotors is evidenced by the fact that copper possesses a high electrical conductivity factor, a low coefficient of expansion for all ordinary operating temperature conditions, sufficient tensile strength to resist the bursting forces created in rapidly rotating bodies, and suitable characteristics for accurate machine work. However, the production of centrifugally cast copper rotors, desirable principally because of the greatly improved electrical characteristics, has heretofore been found difficult due to the high temperature working conditions involved, since copper must be heated to temperatures of the order of 2000° F. for reasons of proper pouring fluidity. At such high temperature, the casting mold must have adequate temperature-resisting characteristics, as well as mechanical strength, at high temperatures, to overcome centrifugal casting stresses. It is accordingly considered preferable to construct the mold parts and elements of a suitable high temperature resistant steel. However, sand or other refractory molds could be used when and if suitably adapted for centrifugal casting work.

An important consideration in the development of a centrifugally cast rotor is the proper or necessary temperature gradient between the molten copper and the mold and core structure within and about which the copper flows. It is obvious that when hot copper strikes the metal of the core and mold, if the latter is cold, the copper will freeze almost immediately. Heating the mold and core to a temperature approaching that of the copper, will materially decrease the rate of exchange of heat from the copper to the mold and core metal, and thereby reduce the rate of freezing of the molten copper. Control of the temperatures of the copper, mold and core assembly, and consequently the rate of heat exchange therebetween, is much to be desired as the fluidity of the copper can thus be maintained until the cavities of the core and mold are completely filled, and further, blowholes, cold chutes and other physical defects are eliminated. A tough, fine grain, ductile and highly conductive copper winding results from a careful control of temperature differential between the copper and the mold and core, by carefully maintaining each thereof within predetermined temperature limits at the time of pouring.

In order to lead to a better understanding of the purposes of and relationships between the several preferred items of production equipment as preferably and successfully utilized in the practice of the process, the procedure will be merely briefly described at this point.

The procedure is initiated by the selection of a suitable quantity of pig copper; this may be in any suitable solid form such as pigs, bars or even clean copper scrap, but it is important that all of the copper constituting the melt be of at least, preferably better than commercial purity, by which is meant that the copper shall not contain more than a trace of arsenic in any form, and obviously not more than a trace of iron, with low total impurities. A copper of average of 99% purity is adhered to, with a variation of not more than a range of 98–99 plus percent. From this there results that there can exist in the finished cast copper elements, no electrolytical bottlenecks or poor conducting portions and from which it further results, as hereinafter more particularly pointed out, that the finished rotor castings are of dependably uniform conductivity. Electrolytic copper is preferably employed as a source, although the specific mode of production, whether electrolytic or smelted, is immaterial so long as the raw material conforms to the requirements just above expressed.

The pig or bar copper of required purity is first melted down in a suitable type of melting furnace, preferably one of induction type, since this form of furnace provides a desirable nicety and ease of temperature control; obviously other furnaces may be used which are susceptible of close temperature regulation. Prior to removal of the copper from the melting furnace, and pouring, the core laminations are assembled and disposed in a mold of special material and construction, and the mold and contents then preheated in a preheating furnace especially arranged for this purpose, the mold, as hereinafter more specifically described, being characterized by metal of a high melting point. Prior to pouring the copper into the mold and about the assembled core of the rotor, the inside surfaces of the mold which are exposed to the copper during casting, and also very importantly, the bar slots of the laminated core structure, are coated by a suitable process, later described, with a refractory and insulating material preferably in the form of a liquid or suspension such that the refractory and insulating material will adhere to the surfaces of the rotor slots and to the inside surface of the mold. With the mold and contents now suitably preheated and coated as described, the molten copper at a temperature of the order of 2400 degrees F., and with the mold and core at a temperature of the order of 1400 degrees F., the equipment and materials are in condition for casting. The technique involved in the step of casting per se, consists, first, in imparting a rotating motion to the mold, and while the mold is being rotated, pouring the molten copper into the mold and into and about the core therein. This rotation is continued for a sufficient time after pouring to assure that all parts of the copper are solidified and that the copper has been brought to fill each and all of the mold and core cavities.

The range of rotational speeds for the spinning step is determined by the strength or resistance to centrifugal forces of the mold, and by the degree of density desired in the cast copper structure. It is obvious, therefore, that the increase in size of mold will necessitate a lower speed range, and with a lower rotative speed the uniformity of results, as to physical characteristics of the copper windings, becomes uncertain and undesirable. The working temperature of the mold, at the time of spinning and pouring, will determine the upper speed range when considered along with the density of copper desired. Thus, with these several factors in mind, a range of rotative speeds from about 1100 to 1800 R. P. M. has been selected as the range most conducive to uniform and successful results.

After the copper elements of the rotor have been completely cast, the rotating mold and associated parts brought to rest, and the mold and contents completely restored to ambient temperature, the mold and contents are subjected to a reheating step. For this purpose a separate reheating furnace is employed, which may be kept at or raised to a temperature say of 900 degrees F. This temperature is not sufficient to result in even an approach to a fluid condition of any part of the copper, but results in a thermal expansion of the parts of the mold ahead of the mold contents, thus enabling the rotor easily to be freed from the mold. While the rotor is still at an elevated temperature, advantage of this fact is taken to separate the now completely cast rotor from a mandrel element or the like used internally of the rotor during casting, and following the latter step and a suitable cooling of the rotor, it is subjected to any necessary or desirable roughing and finishing operations. These include, in cases where necessary, a complete removal of any excess copper from the periphery of the core portion of the rotor; approximate finishing of the end rings, and removal of any small amounts of excess copper which may adhere to the end laminae of the core internally of the end rings. The roughing and grinding steps are followed by final finishing operations as may be necessary in a few cases, which operations are followed by or carried on concurrently with the steps of dynamically and statically balancing the rotor, thus putting it in condition for assembly into the frame of the machine.

In carrying out the principles of the invention as set forth above, reference will be had to the drawings, and to the following description of the rotor structure, as well as a more detailed description of the method, procedure and certain of the apparatus utilized in its production.

Figures 1, 2, 3:
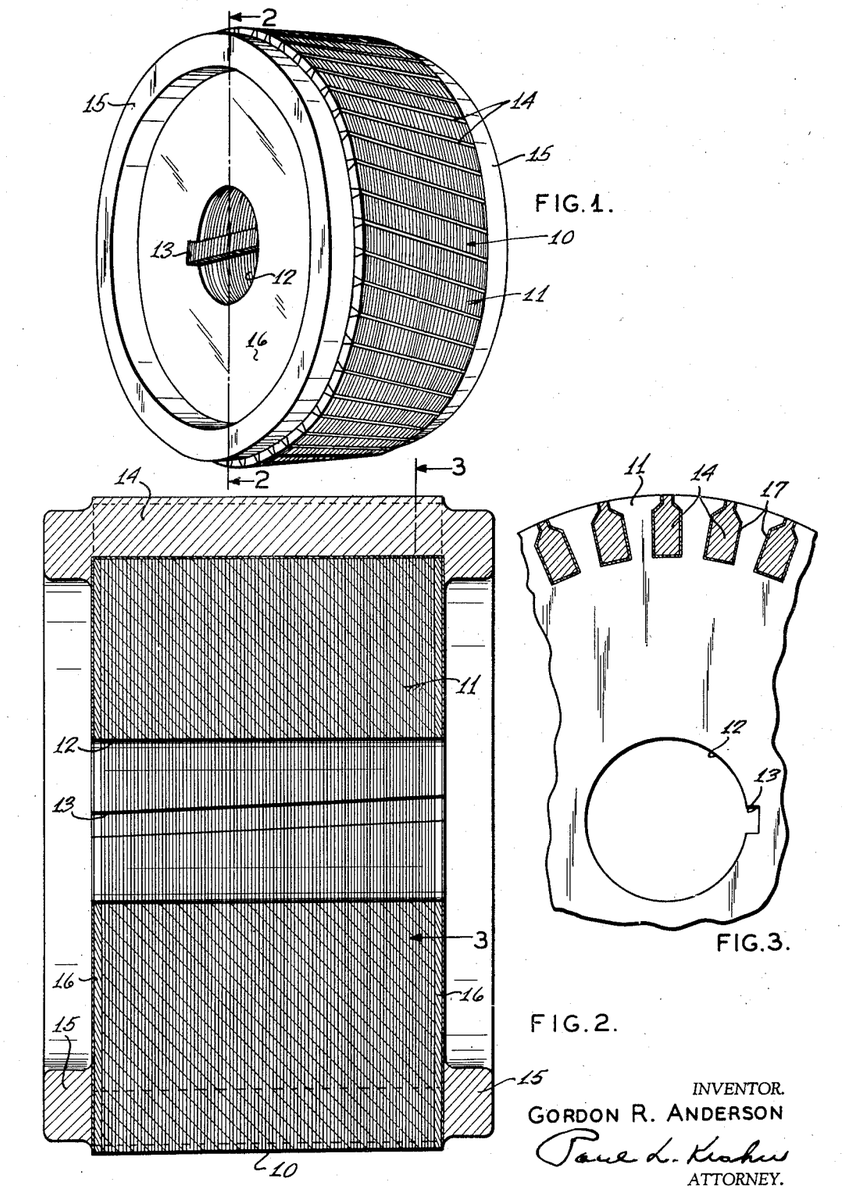
Fig. 1 is a perspective view of the finished rotor member which constitutes an important part of the present invention.
Fig. 2 is a sectional elevation of the rotor member as seen at line 2—2 of Fig. 1.
Fig. 3 is a fragmentary plan of the rotor showing the refractory coating in the rotor bar slots as seen along line 3—3 of Fig. 2.

The completed cast rotor having a one-piece centrifugally cast copper, squirrel cage structure is shown in Figs. 1 and 2, wherein the magnetic core 10 is comprised of peripherally slotted steel sheets or laminations 11, having a centrally located shaft aperture 12 and a keyway 13, the major elements of the rotor being completed by the copper conductor bars 14 and end rings 15. The end or face laminations 16 (Fig. 2) of the core 10 are preferably constructed of a heavier gauge sheet metal for an obvious purpose. The refractory coating in the core slots of the rotor 10 is indicated at 17, Fig. 3. Further details of this important feature will be hereinafter noted.

The production procedure and equipment best adapted to the construction of the rotor above noted, will now be set out and described, of course, keeping in mind the general principles pointed out hereinbefore as well as the objects to be attained thereby.

The centrifugal casting operation is carried out by means of a suitable mold structure (Fig. 6) securely clamped to and revolvably connected to a suitable spinning chuck plate mechanism and supporting structure therefor (Figs. 8 and 14), the details of which will be described presently. The mold structure consists of a top mold 20 formed to provide a tapered pouring mouth or aperture 21, a recess 22 having a slight drag or tapered peripheral wall and constituting a mold cavity for the formation of one of the rotor end rings 15, a central recess 23 for the reception of the stacked laminae 11, and a lower end recess 24 provided to receive a bottom mold plate 25. The top mold 20 is further formed with an exterior annular groove 26 located near the bottom or open end thereof. This groove 26 receives the jaw clamping mechanism carried by the spinning chuck plate mechanism above generally, and hereinafter more particularly referred to.

The bottom mold plate 25, received in recess 24 and held therein by frictional engagement or a slight press fit, is annularly recessed at 27 to provide a rotor end ring cavity 30 similar in all respects to the ring-forming recess 22 of top mold 20. The peripheral land or shoulder portion 31 of mold plate 25 forms an abutment to engage the annular shoulder separating the recesses 23 and 24 of top mold 20, and also provides a peripheral clamping means for the laminae 11 in cooperation with the shoulder formation between recesses 22 and 23, all as will readily appear from the drawings. A centrally apertured land or boss 32, formed on mold plate 25, forms an abutment for the central area of the stack of laminae 11. Spaced holes 28, for example three in number, are formed in the mold plate 25, extending therethrough from the bottom face of recess 27, and provide vent openings for the escape of air, steam or vapors trapped or generated during the copper pouring process, as will be noted later.

A mandrel or arbor 33, upon which the laminae 11 are stacked and are keyed in non-rotative relation by means of key element 34 seated in keyway 35 in the mandrel shank 36, is formed with a flange or projecting rib 37 which is received in a recess 40 in the bottom face of mold plate 25. The seating of flange 37 in recess 40 serves to locate the mandrel shank 36, upon which the laminae 11 are stacked, in proper relation to the laminae receiving recess 23 in the top mold 20. Mandrel 33 projects through the aperture in boss 32 and is keyed to the mold plate 25, as by means of key 34 which extends into the zone of the flange 37 as shown. The upper or core-holding end of the mandrel 33 is adapted for the securement of a clamping cap element 41 as by a threaded eye bolt 42, engaging a tapped recess 43 (Fig. 4) therefore, located axially of the outer end of the mandrel or arbor 33. The cap 41 is suitably recessed at 44 to fit snugly over the arbor 33 and a key slot to receive the end portion of key element 34 is provided as at 45. Cap 41 is formed to provide a relatively wide annular beveled face 46, as shown, for the purpose of increasing the effective throat area of the pouring aperture 21, as is apparent from the drawings (see Fig. 6). The slope of cap 41 also acts during pouring, to direct the stream of molten copper toward the periphery of the mold. The lower end 47 of mandrel or arbor 33 is formed with a pair of diametrically opposed recessed flats 48, and a tapered end portion 50, as shown, whereby the arbor may be received in a clamping device, the purpose of which will be pointed out hereinafter.

Suitable metals from which the above described mold parts may be made, consist of stainless steel comprised, in part, of 18 percent chromium and 8 percent nickel, and "Ni-Resist" a commercially well known high temperature nickel-steel. These metals have the desired physical characteristics, before noted, and are herein preferred, though other metals may be developed or procured which will serve the same or a similar purpose. In the present case, for example, the mold parts 20 and 25 are formed of "Ni-Resist"; the arbor 33 of the "18–8" stainless steel; and the key element 34, cap 41, and eye bolt 42 also formed of the stainless steel, above noted. These special high temperature, nonmagnetic steels have been selected, after protracted experimentation, for the reasons that the deterioration due to repeated heating and cooling is exceedingly low and as a result the repeated use of the mold parts economically justifies the initial cost of these steels; the resistance to centrifugal stresses, while the mold parts are at high temperatures, is entirely adequate to provide a reasonable working safety factor, and the nonmagnetic characteristic of both the "Ni-Resist" and "Stainless Steel" enhances the adaptability of the metals to induction type furnace work. A typical analysis of the Ni-Resist steel alloy shows the following:

Copper 5.33 per cent; chromium 3.27 percent; nickel 14.31 percent; silicon 1.62 percent; and total carbon 3.04 percent.

Figure 4:
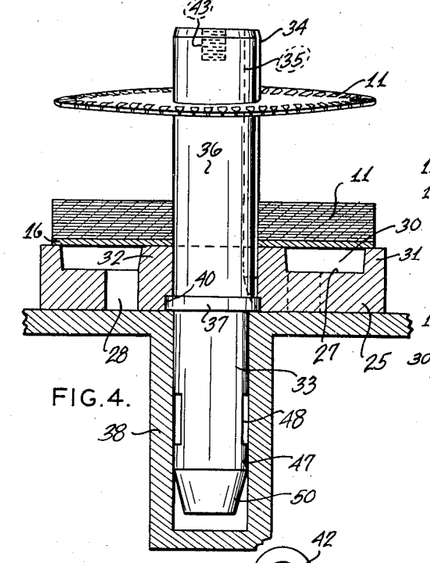
Fig. 4 is a partial sectional elevation illustrating the steps in the assembly of the core laminations on the mold plate and arbor.
Figure 5:
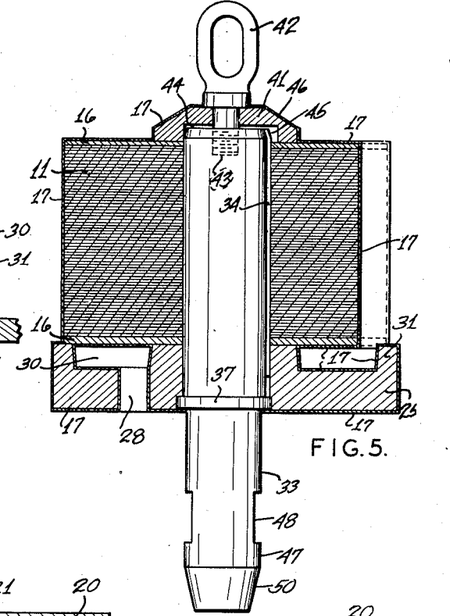
Fig. 5 is a further partial sectional elevation showing the completion of the assembly of Fig. 4 and the application and extent of refractory coating required.
Figure 6:
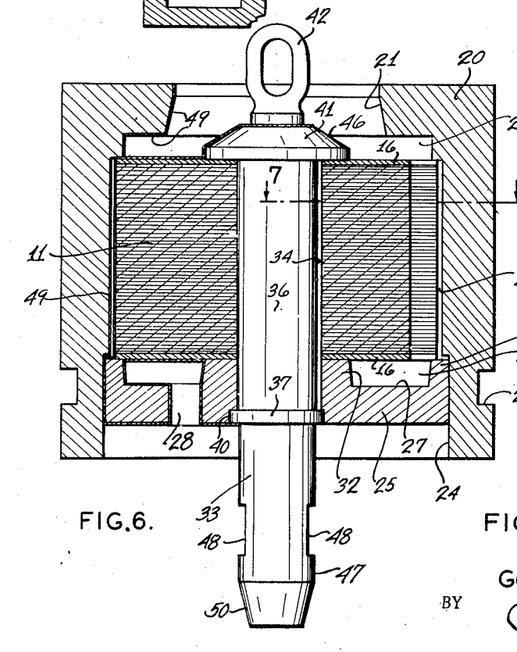
Fig. 6 is a still further sectional illustration of the mold and core assembly showing the complete assembly and refractory coating of the mold cover and contents.

The mold parts 20 and 25, arbor 33 and laminations 11 are assembled in any convenient manner or as indicated in Fig. 4. The lower mold plate 25 and arbor 33 are assembled and placed upon a work surface or support. Such a support is diagrammatically indicated at 38 and includes a flat surface for the mold plate 25 and a central recess or slot for the reception of the end 47 of the mandrel 33. Key element 34 is positioned in keyway 35 to lock the mandrel and plate in position. A predetermined number of laminations 11, preferably, numerically determined by weight in this case, are next positioned on the shank 36 of mandrel 33 such that the key 34 engages the keyway 13 of each lamination. The angular or skewed relation of the laminae slots (Fig. 1) is obtained by forming the raised or locking face of key 34 at the selected angle therefor. This angular slot arrangement is usual practice and needs no further explanation. The heavier gauge end face laminations 16 are, of course, positioned to embrace the central stack of laminations 11. Upon completion of the above steps, the cap 41 is pressed into position upon the end of arbor 33 and is engaged by key 34 seating in key slot 45. Eye bolt 42 is then threaded into recess 43 and tightened down upon cap 41, so that the central area of the stacked laminae is firmly compressed between cap 41 and the central land or boss 32 of mold plate 25. The final assembly of these parts and elements assumes the appearance as indicated in Fig. 5. The assembled core 10, bottom mold plate 25 and arbor 33, are now in condition to be received in the top mold member 20 (Fig. 6). However, there is an important step to be taken before this latter assembly may be effected. The exposed surfaces and cavities of both the core and mold plate assembly and the top mold, must be coated with the insulating refractory material before noted in the general discussion and objects.

The selection of a suitable refractory material is based upon factors governed by the working temperatures involved in centrifugal casting of molten copper, the resistance to erosive and mechanical forces created by rapidly flowing molten metal, and insulating properties best adapted to aid in the control of the transfer of heat between masses or bodies of differing temperatures, as well as electrical insulating properties desirably a feature in electrical rotor members generally. There are several possible materials which possess the above noted characteristics; notably among these is a refractory material known commercially as "Red Bull Talc," and it is this latter material which is herein preferred. A finely powdered quantity of this refractory material is mixed with a ten percent solution of sodium silicate and water such that a mechanical mixture or aqueous suspension of approximately 14° Baumé gravity results. This refractory suspension was determined upon after repeated experimentation, and found to possess all of the requisite characteristics above noted. Since this material is not to any great extent a true solution, it is necessary to continually agitate the liquid in order to maintain an even consistency or density thereof.

Figure 7:
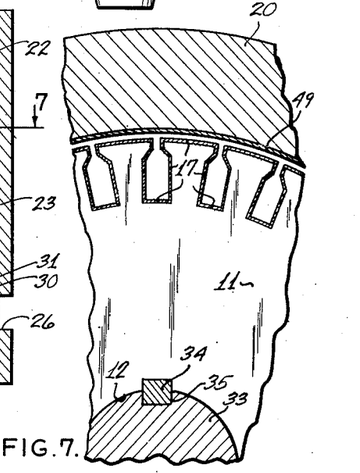
Fig. 7 is a fragmentary section illustrating the extent of the refractory coating in greater detail as seen along line 7—7 of Fig. 6.
Figures 13, 14, 15, 16:
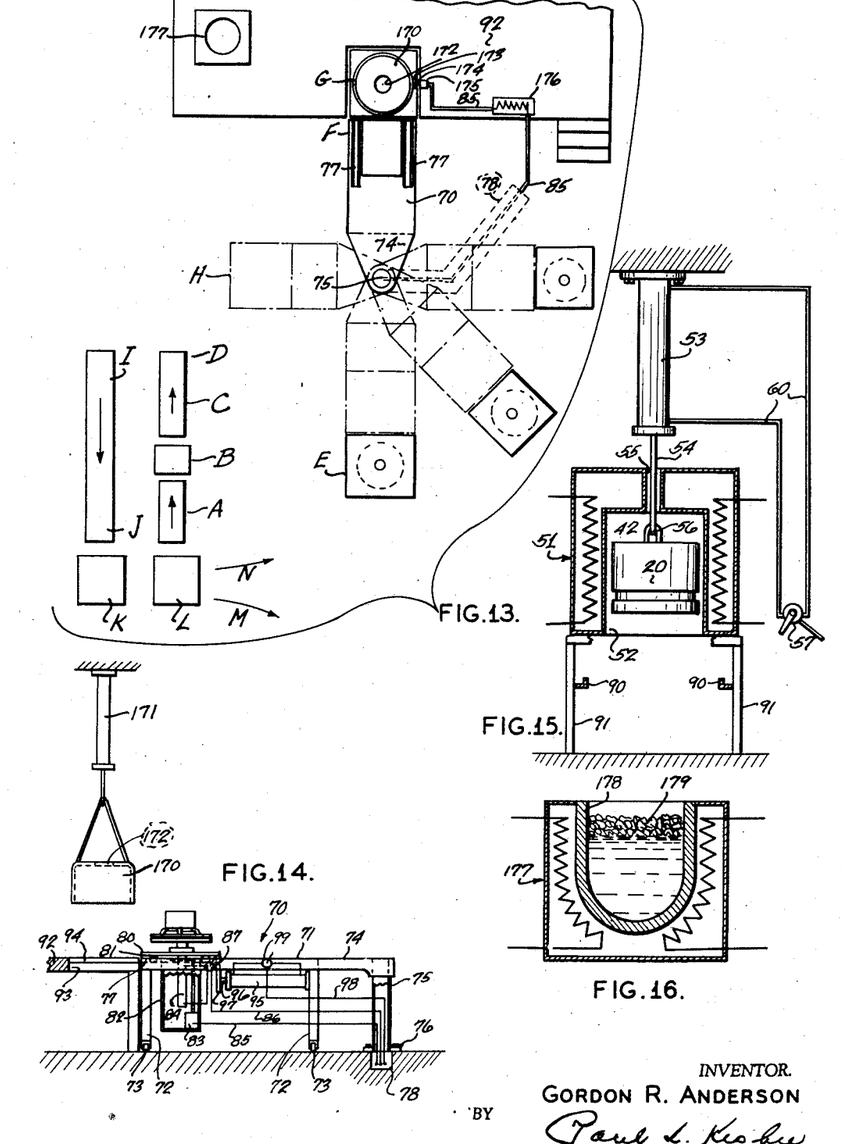
Fig. 13 is a diagrammatic floor layout indicating the location of the several items of apparatus and the order of steps in the process for making cast rotor members.
Fig. 14 is an elevation of the mobile work table or spinner supporting member, the location of which is indicated in Fig. 13.
Fig. 15 is a partial sectional elevation showing a preferred construction of electric furnace and associated hoist apparatus.
Fig. 16 is a section through an electric melting furnace of a type herein preferred.

In the handling and application of this refractory liquid, a tank, indicated generally in Fig. 13, is provided and a suitable agitator is placed therein for the reason noted. The coating step in the preparation of the core and mold is effected by dipping the assembled core 10, mold plate 25 and arbor 33 into the tank, so that the surficial and recessed surfaces thereof receive a thin, even coat. This coating is then permitted to dry. Such a refractory coating is indicated at 17, and referred to generally in connection with Fig. 3; other locations of the coating appearing in Figs. 5, 6 and 7. A similar coating 49 is applied by hand painting, spraying or in any other convenient manner to the inside surfaces of top mold 20, and is indicated as covering the throat 21, recess 22 and core-receiving recess 23. When the refractory coating has dried sufficiently, the two major parts of the mold are assembled, as indicated in Fig. 6, and bottom mold plate 25 is retained in its seating recess 24 of top mold 20, as by a press fit or by frictional engagement of the mating surfaces thereof.

The mold and contents, now fully prepared for further operations, is placed in a heating furnace 51 (Fig. 15), preferably of induction type as before noted, and the whole assembly raised to a temperature of the order of 1850 degrees F. The furnace loading and unloading is accomplished by providing a mold-receiving bottom opening 52 in the furnace 51 and utilizing an over-head type air hoist 53, indicated generally in Fig. 15. The operating plunger or arm 54 of the hoist 53 passes through a fairly close fitting aperture 55 in the top of the furnace 51, and a hook member 56, pivotally or swivelly attached to the lower end of the hoist plunger or operating arm 54, engages the eye bolt 42 in the end of arbor 33, thereby suspending the mold in a position below the opening 52. A three-way control valve 57 in the air supply lines 58 to the hoist 53 is placed conveniently adjacent the furnace so that the operator may control the operation of the hoist 53 to raise or lower the arm 54 and attached mold into or out of the furnace 51, respectively. The construction of the furnace and the arrangements for moving or lifting the mold assembly into and out of the heating chamber, are intended merely to indicate a satisfactory and preferred arrangement thereof, though other arrangements may be equally well adapted to accomplish the same purpose.

The placing of the mold and contents in position to be moved into the furnace 51 is, in this case, a manual operation, but the removal therefrom after heating requires special equipment which must be substantially unaffected by the high temperatures involved, and must be mobile and positive in its operation so as to transport the heated mold to the pouring station with a minimum of heat loss or temperature drop, as the close adjustment and maintenance of the temperature gradient between the mold and contents and the molten copper is of prime importance in the achievement of a commercially successful rotor member. The apparatus 70 for handling the heated mold assembly is comprehensively indicated in Fig. 14; however, this device is only intended to illustrate a preferred arrangement and construction of a mobile transporting and work-holding means. As shown, a horizontally arranged frame 71, is supported upon corner legs 72, the lower end of these legs contacting the floor through caster members or wheels 73. This frame and roller leg structure will be hereinafter referred to as the work table. The work table 70 is constrained to move in a circular path by means of an arm member 74, pivotally connecting the work table to a pivot post 75. The pivot post 75 suitably anchored or bolted to the floor by means of bolts 76, is of hollow construction and the space therein is utilized to house and support the electric power lines and air supply lines for certain operating elements carried by the work table. A cable and pipe conduit 78, in the floor, serves to direct these lines to the floor end of the post 75.

The outer end of work table 70 is provided with a pair of parallel track members 77 and carried on this track is a movable carriage 80 having rolling contact therewith through wheels or rollers 81. (See Fig. 8.) The carriage 80 supports the mold spinning and clamping mechanism which will be described in detail in connection with Figs. 8, 9 and 10. The inner end portion of work table 70 is provided with a top plate or work surface (not shown), upon which certain necessary tools and other parts may be placed so as to be accessible to the operator. The carriage 80 has a depending cylindrical housing 82 rigidly affixed thereto; the housing being adapted to contain an electric motor 83 and a pneumatic ram device 84, these latter members constituting part of the spinning and clamping assembly for the mold and contents, later to be noted. A flexible electric power cable 85 extends from the motor 83 to and through the hollow pivot post 75 and floor conduit 76 to a suitable control station. Similarly, air line 86 supplies air to the ram device 84, control valve 87 being inserted in the line and positioned upon the frame 71, as indicated.

Referring again to the movable carriage 80, it will be noted that this member is adapted to move outwardly of the end of the work table 70, so that certain operations may be performed and carried out, as for instance, the reception of the heated mold assembly upon its discharge from the heating furnace 51, and again at the pouring station where the mold is positioned and placed in condition to receive the molten copper. In each of these locations the carriage is run out or extended so as to be in its proper position. It is necessary, therefore, to support the carriage while in its extended position, and consequently a supporting track 90 is provided on the furnace supporting structure 91, as indicated in Fig. 15. The rollers 81 ride onto the track members 90 and thus enable the carriage 80 to assume its mold receiving position beneath the furnace opening 52. Similarly, the raised platform 92, provided at the pouring and spinning station, is recessed or notched at 93 (Figs. 13 and 14) and roller guideways or tracks 94 provided to receive the carriage rollers 81. Carriage 80 is moved into or retracted from this extended position by means of a pneumatic ram 95, rigidly carried upon the under side of the work table 70 as indicated. The ram arm 96 is secured to a push plate 97 carried at the inner end of the carriage 80. Air for operating this ram is supplied thereto through pipe 98, while a line control valve 99 regulates the direction of ram movement. The work table 70, with the carriage 80 in its retracted position (Fig. 14) may be manually moved through its circular orbit, or a motor or other power means may be adapted for this purpose.

Figure 8:
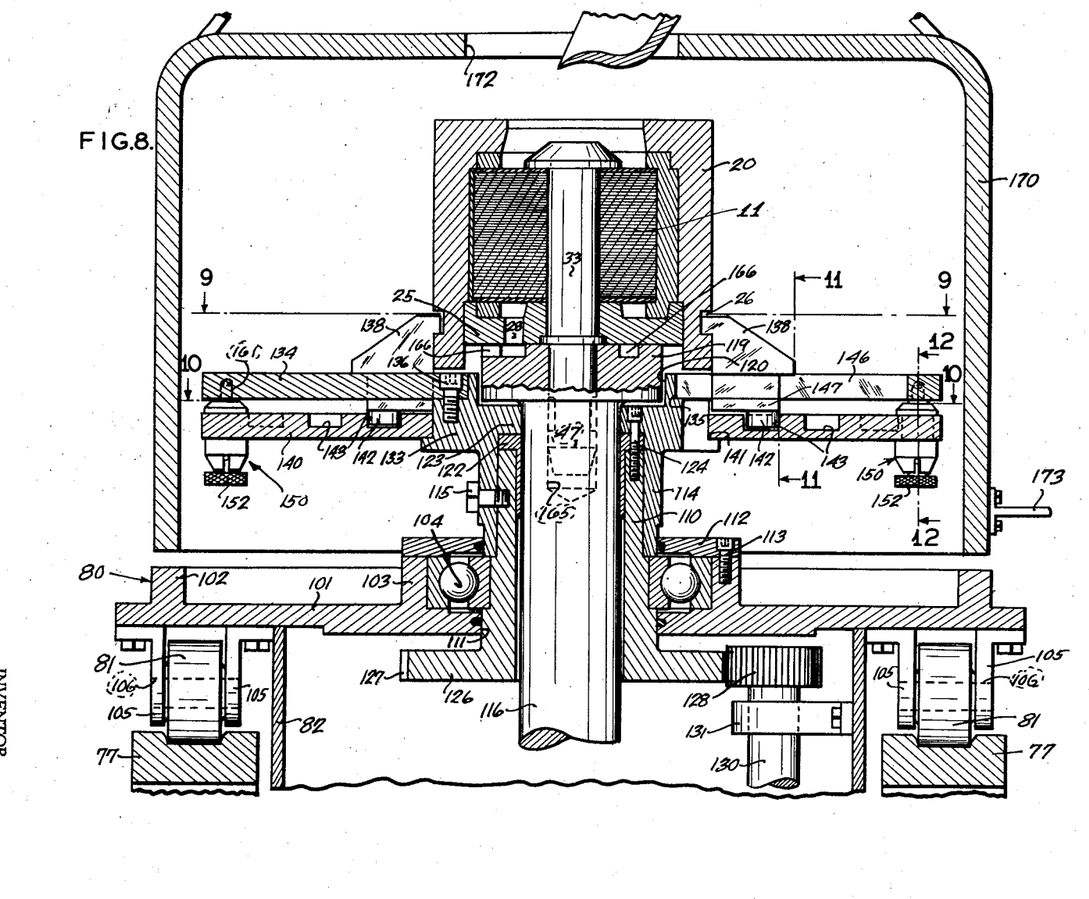
Fig. 8 is a sectional view of the spinner mechanism and associated supporting parts, as well as a view showing the mold and protective hood in place about the spinner plate.

The details of the carriage 80 and associated parts are indicated in Fig. 8. The carriage, per se, consists of a flat supporting surface 101 formed to provide, on its upper face, a rib or raised circumferential flange 102, and a central raised flange 103 adapted to the outer race of a thrust bearing 104. The carriage support consists of rollers or wheels 81 mounted in supporting bracket members 105 through a shaft or axle 106, clearly indicated in Fig. 8. The rollers 81 operate in track or guide members 77, the latter forming a part of the work table 70, before noted. Operably and revolvably carried by the carriage 80 is the mold clamping and spinning organization now to be described.

A supporting sleeve 110, projecting through an aperture 111 in plate 101, carries the inner raceway of bearing 104, above noted. A retainer plate 112 confines the bearing 104 to a limited axial movement or play. Screws 113 fasten plate 112 to the upper face of the flange 103 as shown. A second sleeve or head member 114 fits over the upper end of sleeve 110, in telescoped relation, and one or more set screws 115 retain these sleeves in locked relation. Slidably carried within the sleeve 110 is a piston rod 116. The upper end of the rod 116 is enlarged, as at 119, and this head 119 seats in a recess 120 in the sleeve 114. A packing ring 122, of suitable material, is clamped between the upper end of sleeve 110 and the lower face of an internal flange 123 formed on sleeve 114. Screws 124 seat in flange 123 and threadedly engage the end of sleeve 110, thus retaining these elements in assembly, all as clearly indicated. The lower end of sleeve 110 is flanged, as at 126, and the peripheral face of this flange 126 is suitably cut to provide gear teeth 127. A pinion gear 128, carried on power shaft 130, meshes with the toothed flange 126 and serves to rotate the sleeve assembly. Shaft 130, suitably supported in bracket arm 131, is direct-connected to the motor 83 (Fig. 14) before noted. Bracket arm 131 is supported on the side wall of the housing 82. The piston rod 116 is connected to a piston (not shown) which operates in an air cylinder 84 (Fig. 14), also contained in the housing 82.

The sleeve 114 is formed to provide an enlarged head portion 133 upon which is mounted a circular spinner plate 134. The plate 134 is seated in a recess or annular notch 135 formed in the face of the head portion 133. A series of bolts or screws 136 rigidly secure the plate 134 in the annular notch 135. A plurality of clamping members or jaw elements 138, slidably carried on the plate 134, are adapted to engage the mold assembly through the provision of the annular recess 28 formed in top mold member 20, before described, and shown in Fig. 6. A suitable cam plate means 140, carried in a face recess or notch 141 formed in head 133, serves to move the clamping members 138 into or out of engagement with the mold recess 28, as by a camming action between depending lugs 142, integrally formed with clamps 138, and grooves or channels 143, formed in the face of plate 140.

Figure 9:
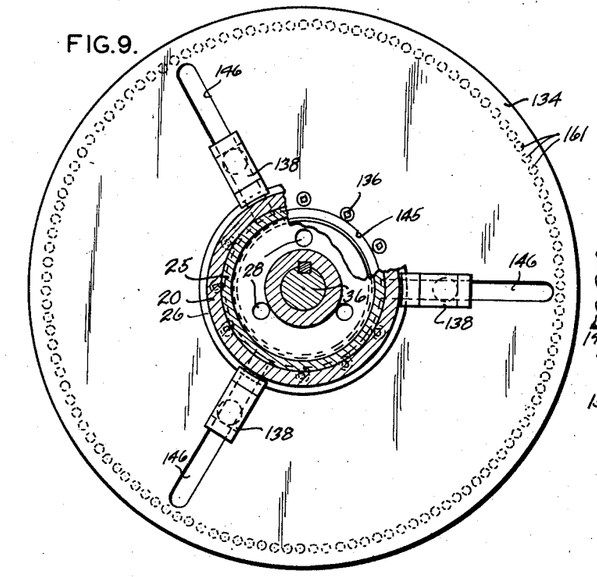
Fig. 9 is a plan of the spinner plate illustrating the clamping jaw guide slots as seen along line 9—9 of Fig. 8.
Figures 10, 11:
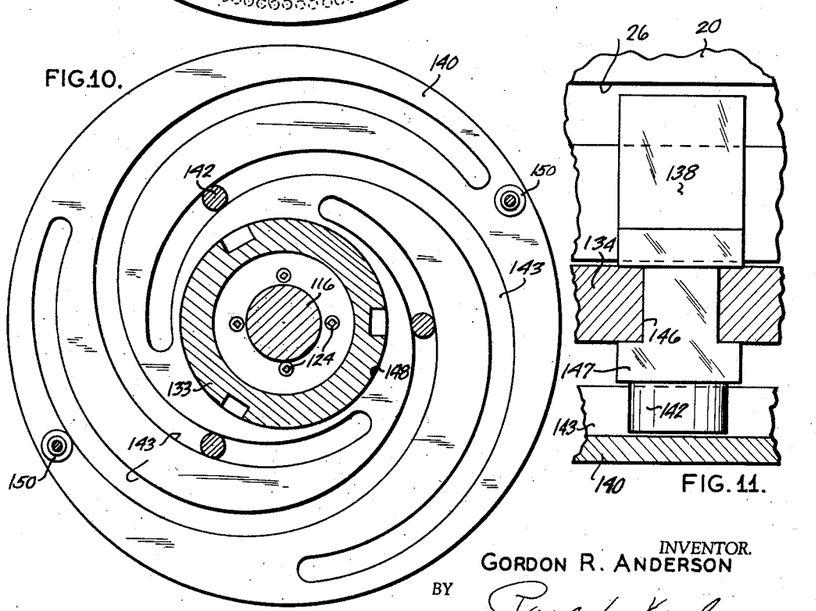
Fig. 10 is a plan view of the cam plate adapted for actuating the clamping jaws as seen along line 10—10 of Fig. 8.
Fig. 11 illustrates certain details of the form and mounting provisions for the jaws as seen along line 11—11 of Fig. 8.

The details of the spinner plate 134 and cam plate 140 are shown in Figs. 9 and 10, respectively. The spinner plate 134 (Fig. 9) is centrally apertured at 145, so that the plate will fit on the notch 135 of head member 133, before noted. A series of bolt holes are provided adjacent this aperture 145 for the reception of holding bolts or screws 136. Three grooves or slots 146 are cut through the plate 134 and are radially directed and spaced at angles of 120° therebetween. The clamping members 138 are slidably retained in the channels 146 by means of an integral, depending T shaped portion 147, the details of which are shown clearly in Fig. 11. The lugs 142, above pointed out, are carried on the lower face of the T shaped guide members 147, and project into camming grooves 143 in cam plate 140. As may be seen in Fig. 10, the cam plate 140 is formed and machined to provide spirally directed grooves 143, there being as many such grooves as clamping elements 138. The inner ends of grooves 143 are located adjacent the central aperture 148 in plate 140, and the outer ends terminate adjacent the peripheral margin of the plate, all as may be seen in Fig. 10.

In the assembled arrangement of spinner plate 134 and cam plate 140 upon the head 133 of sleeve member 114 (Fig. 8), the plate 134 is rigidly secured to the head 133 by means of screws 136, while plate 140 is free to rotate relative to the head 133 and plate 134. This relative movement between the plate members is utilized to effect movement of the clamps or jaw elements 138, in radially inward or outward directions. This movement is transmitted to the jaws 138 through sliding contact of lugs 142 in spiral or cam slots 143. To effect this jaw movement, the operator holds plate 134 and turns plate 140 in the desired direction so that jaws 138 are drawn up to engage the mold groove 26, or are backed off to release the same.

Figure 12:
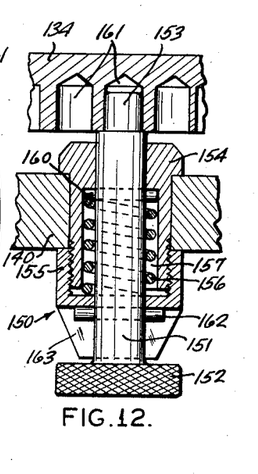
Fig. 12 is a section through a snap-action locking pin device for locking plates of Figs. 9 and 10 from unintended relative movement as seen along line 12—12 of Fig. 8.

Once the jaws are brought up to clamping position (Fig. 8), as above described, a locking device 150, carried by the cam plate 140, is actuated so that the two plates are prevented from further unintended relative movement. The locking device 150 consists of a retractible lock pin 151, provided with a knurled head 152 at one end, and a recess-engaging tip 153, of reduced diameter. The pin 151 is mounted in a bushing or body member 154 carried in the margin of plate 140, the bushing 154 being inserted in plate 140 from the top or upper face, as shown in Fig. 12. The bushing or body member 154 projects below the plate 140, and a holding nut or cap member 155 is threadedly received over this projecting end, and turned up into abutment with the bottom face of plate 140. A spring member 156, encircling the pin body 151, is retained in the space 157 between the body member 154 and cap 155. This spring acts, through abutment with the cap 155 and a pressure pin 160 or like member, carried by the pin 151, to urge the pin tip 153 upwardly and into engagement with the selected one of suitably arranged recesses 161 in the plate 134, thereby locking or preventing the plates from further unintended relative movement. Upon disengagement of the locking pin from the plate 134, the device is retained in retracted position by means of the engagement of a second pin 162 with an axially projecting rib 163 carried by the cap 155. The operator, through the knurled head 152, may retract the locking pin 151 and then, when pin 162 clears the end of rib 163, and after a 90° rotation of the head 152, the pin 162 will be positioned across the rib 163 so as to maintain the device in retracted or unlocked position. The spring 156 is held in compression in the body space 157 until disengagement of pin 162 from rib 163. In the present example, two such locking devices are shown (Figs. 8 and 10), but any number may be employed. It will be noted further that the marginal portion of the under face of plate 134 is provided with closely arranged recesses 161 so that the plates 134 and 140 may be locked in any one of a plurality of positions, as desired.

Referring again to Fig. 8, the procedure for securing and clamping the mold on the spinning plate 134 consists in, first, centering the mold so that the jaw elements 138, when drawn up as before described, will each bear an equal portion of the clamping load, and so that the jaws will positively engage the groove 26 formed in the top mold member 20, and second, actuating the air ram or press 84 so that the head 119, on the upper end of piston rod 116, will properly engage the bottom mold plate 25 and press this plate into rigid engagement with the top mold 20 and against the clamping jaws 138. To assist in centering the mold assembly, the ram head 119 and a portion of the rod 116 are drilled out or otherwise recessed, as at 165, for the reception of the end 47 of arbor 33. This center recess 165 is the preferred means for accurately and positively centering or locating the mold assembly, because it is important to prevent any rotational unbalance or off-center position of the mold and spinner plate as such an unbalanced condition may create dangerous vibrations during the spinning operation.

The head 119 of the air ram device 84 is further provided with slots or grooves 166, which cooperate with apertures 28 in mold plate 25 to assist in the escape of any air or other gases which are trapped or generated during the pouring period or thereafter.

Referring to Fig. 13 of the drawings, the preferred arrangement of the several items of apparatus, or floor layout thereof, is indicated. In the exemplary arrangement shown, A indicates the assembly point for the core laminations 11, mold plate 25, and mandrel 33. After the assembly, the unit is coated with the refractory material as by dipping in a tank B. At the same time the top mold or cover 20 is internally coated, this step being performed at station C. The two major mold parts, after a period of drying, are then assembled and placed at point or station D, convenient to the heating furnaces 51. The work table 70 is moved about its pivot post 75 so that the outer end thereof describes a circle, and upon this circle line are placed a battery of electric induction furnaces 51, three being shown. The details of one such furnace are indicated somewhat diagrammatically by Fig. 15. The pouring station or platform 92 is also located on this circle line, but opposite to the battery of furnaces. During movement of the work table the carriage 80 is retracted or moved inwardly of the end of work table 70. The operator takes a mold assembly from point D and places it in the heating furnace. When the mold and contents reach approximately 1850 degrees F., the work table is moved to that furnace, for example E, and when in proper position, carriage 80 is run under the furnace, as by manipulation of air control valve 99, and the heated mold lowered upon the spinner plate 134. The carriage is then retracted and the work table moved about to the pouring station F, which is opposite the slot or recess 93 in platform 92. At this point F, the operator clamps jaws 138 (Fig. 8) about the mold 20, and operates air valve 87 to drive the ram head 119 upwardly and against mold plate 25. This latter step acts to lift the entire mold and contents so that any play of the jaws 138 will be taken up. This also lifts the mold off the spinner plate 134 and provides a passage for the escape of air and other gases forced through apertures 28 and slots 166.

Upon completion of the clamping and securing operation, the carriage is run outwardly and into the recess 93 so that the mold and supporting plate are positioned, as at station G. At this point a hood member or safety guard 170 (Figs. 8 and 14) is lowered or placed over the mold and spinner plate assembly, as by means of an air hoist mechanism 171; this air hoist being similar to the previously described hoist 53 (Fig. 15). The hood 170 encloses the mold and spinner plate and comes to rest adjacent the flange 102 on carriage plate 101 (Fig. 8). This complete enclosure of the rotating parts of the mechanism adds to the safety of the pouring operation, as any splashing of molten copper will be confined to the inside of the hood 170. The top surface of the hood is provided with a central aperture 172 so that the molten metal may be introduced to the mold body, positioned therebelow (Fig. 8). At the time that the hood 170 is positioned as shown in Fig. 8, an arm or striker element 173, carried on the side of the hood makes contact with the operating arm or lever 174 of a switch 175, preferably of mercoid type, although several suitable forms of other quick acting switch will be suitable. The switch 175, upon being actuated to circuit-closing position, completes the circuit to the spinner drive motor 83 through a motor speed control device or resistance unit 176, as by wire 85 (Fig. 13). This power circuit and mercoid switch arrangement is greatly to be desired, as the mold and spinner plate cannot be rotated until the hood or safety guard 170 has been properly positioned as shown in Fig. 8.

The casting metal or copper is melted down, preferably in an induction furnace 177 of the type generally indicated by Fig. 16. The furnace crucible or lining 178 is composed of a high-temperature refractory material, such as lava or the like. The molten copper, now at a temperature of the order of 2400 degrees F., remains in the melting furnace until use, and therefore, to prevent oxidation, the copper is during the melting step, deoxidized with a proper amount of silicon; thereafter, the copper is covered with a layer of charcoal 179 to prevent air oxidation of the hot fluid copper.

Returning now to Fig. 13, the full line showing of work table 70 at point F, indicates the mold is in position for the casting and spinning operation. Upon positionment of the safety hood 170, as above noted, the motor 83 is energized and the speed thereof is determined by the setting of the speed control or rheostat 176, the preferred range of speeds of spinning the mold and contents being between 1000 and 1800 R. P. M. as heretofore briefly referred to. The rotation of the spinner mechanism is commenced at a time when the temperature of the mold has been brought down approximately to 1400 degrees F. The cooling period for the mold, that is from the time it comes from the furnace, at a temperature of 1850 degrees F. to the time it has cooled to 1400 degrees F., provides ample opportunity for the operator to secure the mold to the spinner plate, and to move the work table to the station G for the pouring operation, all as previously pointed out. Assuming that the mold temperature has reached 1400 degrees F. and rotation thereof has begun, the operator next places a ladle, composed of graphite or lava material, in the copper melt furnace 177, and dips out a sufficient quantity of molten copper to completely fill the mold and core cavities. This molten copper is then introduced through the hood aperture 172, and via the mold mouth 21 into the mold. Upon completion of the pouring step, the mold rotation is continued until the copper has completely solidified or set. The hood 170 is then removed, and carriage 80 retracted from the platform slot 93 so that work table may be moved to the discharge station H, shown in dotted outline to the left of pivot post 75 (Fig. 13). An overhead hoist (not shown) is then attached to the mold and the whole is moved to the conveyor track I. The mold is then moved in the direction of the arrow, as by gravity or otherwise, to the opposite end J of the conveyor I where it remains until cool. The core may then be removed from the mold and the separated parts conveyed to their designated stations for re-use, or to proper storage points.

The mold and core separation is carried out by subjecting the assembly to a quick heating operation in an induction furnace K, this furnace being for convenience identical with that shown in Fig. 15. This heating step produces a thermal expansion of the mold parts relative to the core member, as by heating only the mold parts and leaving the core substantially unaffected. Upon completion of this heating step in furnace K, the whole assembly is moved to suitable apparatus L, and the top mold 20 removed or pressed off of the core 11 and mold plate 25. This step is followed by a second separating operation performed upon the core 11 and mold plate 25. Here the mandrel is firmly clamped in holding jaws, or other suitable means, as by the provision of jaw- or clamp-receiving recesses 48 formed in the end 47 of mandrel or arbor 33 (Fig. 6), and the core pressed or forced from the arbor, as by inserting a tri-pronged tool in the apertures 28 and applying a pressure thereto. The cast core member is then moved to the grinding and finishing machines (not shown) along the path indicated by arrow M, while the mold parts are returned along path N to the assembly line A for re-use in subsequent molding operations. This above described floor layout (Fig. 13) indicates a most desirable set-up for the rapid and efficient production of centrifugally cast copper rotor members of the type herein set forth. The items of production equipment, such as the mobile work table 70, furnaces 51, casting table or platform 92, certain of the assembly line provisions, re-heat furnace K, and separator device L, are particularly adapted for the essential and necessary steps in the process for centrifugally casting pure copper rotor members for electrical machines.

It may here be observed that copper rotors, specifically those for induction type motors, have been successfully produced in appreciable commercial quantities by utilization of the method or process hereinabove described in detail. As a result of this experience it has been found that the rotors thus produced, attain fully, each of the several objects hereinabove stated as well as many other objects implied from the ensuing description. By way of still further characterizing some of the outstanding advantages attained by the disclosed practice, it will have been observed that it is impossible, during any production stage, for the initially substantially pure copper, to be contaminated in any noticeable degree by impurities introduced in the course of casting and handling the molten metal. This condition is assured in each of the several steps throughout the whole process, for example, the copper is melted in an induction furnace of a type such as exemplified by the unit of Fig. 16 wherein the copper comes in contact with no metal other than itself, in any zone of the furnace. The molten metal, in being transferred from the furnace to the mold, is so transported in a nonmetallic ladle which prevents absolutely any metallic contamination in this step. Again, and very importantly, in the mold itself, it has heretofore appeared that the mold parts are carefully and completely lined, and thus shielded to preclude any contaminating or alloying contact between the metal and the mold, and the pure copper which later forms the winding of the rotor. Any undesired introduction of metallic impurities is further obviated by the refractory treatment of the winding slots of the laminations constituting the rotor body, all as heretofore specifically pointed out. Thus it appears from the several successive steps of the process described, as from the beginning of the melting of the copper, through the step or period wherein it is again finally and completely set or frozen in the finished product, that the copper is carefully kept from any metallic alloying influence.

From the foregoing it will become apparent that there are prevented (a) any fusion of the copper to the steel or to the metal mold surfaces, and also prevented (b) any pickup by the copper of iron or other metallic impurities when the copper is poured into the mold or assembly and while it remains in fluid state during at least the earlier part of the centrifugal spinning stage.

In order still further to distinguish the present process and the product obtained, from those characterizing the earlier attempts at centrifugal casting of comparable products it may be noted that such earlier and unsuccessful experience in centrifugal casting of contacting copper elements has resulted in a wide and uncontrolled degree of variation in conductivity of the resulting copper elements. To illustrate actual experience, by the older process, the maximum conductivity obtainable never exceeded 70% and conductivities often as low as 40% were encountered. It is herein noted that the percentage conductivity values herein referred to are given with reference to the more or less theoretically 100% conductivity obtainable with chemically pure copper. It is noted now after an extensive experience with the aforementioned process and product, that (a) it is now possible for the first time dependably to obtain any desired conductivity in rotor after rotor, on a production basis, with but inconsequential variations. Furthermore, this susceptibility of accurately controlled conductivity prevails with a further new result (b) in having dependably raised the maximum conductivity up to at least the value of 90%. These results are due in large measure to the fact of the several described steps for preventing pickup of ferrous impurities in any stage of the process, it being noted that only a fraction of a single percent of iron in solution with the copper, creates a marked difference in conductivity.

It is to be understood that the foregoing explicit disclosure is intended solely to teach a preferred method, and to indicate desirable and satisfactory equipment, tools, and other apparatus for carrying into effect the production of a substantially pure centrifugally cast copper rotor member. However, numerous changes and alterations may be effected in the methods and equipment therefor without materially departing from the final results to be obtained, or without departing from the spirit and intended scope of the appended claims.

I claim:

1. The herein described method of forming a cast-core element for an electrical machine which element is of a type having a unitary cast winding structure seated in a supporting core, which method consists in applying a thin coating of a refractory material to the surfaces and slots of a slotted core, in heating the refractory coated core to a degree to stabilize and integrate the refractory, in coating a metal mold element with a refractory, heating the coated mold element to render the refractory thereon substantially impervious, positioning the mold element and core in assembly for casting, in rotating the core, in admitting substantially pure molten copper to the core slots during core rotation, and in continuing rotation of the core until solidification of the copper in the core slots.

2. The described method of casting the copper winding elements in a core for an element of an electric machine, which consists in surface-treating the winding seats of the core, and the internal surface of a mold, with a refractory, heating the core and mold to integrate the refractory, surrounding the core with the mold, pouring molten copper of a minimum purity of 98%, and at a temperature of the order of 2400° F., into the mold containing the rotor core, pouring the molten copper while the mold is being rotated at a substantial speed, and continuing the rotation of the mold and contents until the metal is substantially frozen.

3. The described method of casting, as an integral unit, the copper winding elements of a rotor for an electric machine, which consists in forming a barrier of non-ferrous material in the winding seats of the rotor, forming a similar barrier on the interior mold surfaces, pouring into the mold, molten copper of a minimum purity of 98% at a temperature substantially above the melting point of the copper, maintaining the mold at the time of beginning pouring of the metal, at a temperature of the order of 1300–1500° F., rotating the mold at a substantial speed through the pouring step, and continuing rotation of the mold at least until completion of the step of pouring the copper.

4. The described method of casting as an integral unit, the copper winding elements of a rotor for an electric machine, which consists in applying a refractory coating to the rotor as a base for the winding elements, applying a lining of a refractory to the inner mold surfaces, pouring a metal which is essentially a substantially pure molten copper into the mold containing the rotor core, and while the metal is at a temperature of the order of 2000–2500° F., heating the mold to a temperature, at the time of beginning pouring, of the order of 1300–1500° F., and pouring the molten copper into the mold while the mold is being rotated at a substantial speed, thereafter continuing the rotation of the mold and contents at least until the completion of the pouring step.

5. The described method of casting as an integral unit, the copper winding elements of a rotor for an electric machine, which consists in pouring molten copper of a minimum purity of 98%, into a mold containing the rotor core or equivalent winding support, coating and thermally integrating a refractory surface covering on the winding support and internal mold surfaces, pouring the molten copper while the mold is being rotated at a speed within the range of 800–1800 R. P. M., and continuing rotation of the mold and contents at least until the molten metal is completely introduced to the mold.

6. The described method of casting the copper windings of one element of an electric machine, which consists in pouring molten iron-free copper into a spinning mold containing a support for the windings, adhesively lining the mold with a non-ferrous refractory adhesively coating with a refractory, the surfaces of the support to be engaged by the windings, and spinning the mold substantially until the copper forming the windings, is frozen throughout its mass.

7. The described method of casting copper windings for one element of an electric machine, which consists in melting the copper in a container having a non-ferrous surface portion engaged by the copper, transferring the molten copper for pouring, in a second container provided with a non-ferrous surface engaged by the molten copper, adhesively lining a mold with a refractory material of insulating characteristics, coating the surfaces of a winding support with an integrated insulating barrier to engage the windings, pouring the copper into the mold and spinning the mold while pouring, and in homogenizing the metal by continuing the rotation of the mold until the copper therein is substantially frozen.

8. The described method of casting copper windings for one element of an electric machine including a core, the method including the steps of melting by inductively heating, a substantially iron-free copper, lining the mold and coating the core surfaces within the mold, with a silicate refractory and adhesively securing said refractory to the interiorly exposed mold surfaces, rapidly rotating the mold and contents, pouring the copper into the mold during rotation, continuing rotation of the mold until substantial freezing of the copper, inductively reheating the mold and contents only to the point of loosening the cast windings and core from the mold, and removing the contents of the mold.

9. The herein described method of forming a bi-metallic winding and core element for an electric machine, which consists in surrounding a substantially assembled core structure by a mold, admitting to the mold a molten conducting metal which consists essentially of copper, confining said metal substantially throughout the mold cavities by a wall of a refractory material, and rotating the core and mold at a substantial speed at least until the mold cavities are filled with the conducting metal.

10. The herein described method of forming a core and winding structure for an electric machine, which structure is of a type characterized by conducting elements cast into the core, the method consisting in surrounding a substantially assembled core structure by a mold, forming a metal-engaging surface interiorly of the mold which is substantially impervious to the molten conducting metal, forming on those portions of the core structure to be engaged by the molten casting metal, a substantially impervious coating of a refractory material, admitting to the mold and core a molten conducting metal which consists essentially of copper, and rotating the mold with the core therein, at a substantial speed until the conducting-metal-receiving cavities within the mold are substantially filled with the molten conducting metal.

11. The described method of forming a core and winding structure for an electric machine, which structure is of a type characterized by cast conductor bars and end rings cast integrally with said bars, the method consisting in erecting a sealing barrier of a refractory material peripherally of the assembled core structure of the rotor, forming a barrier of a similar material in the bar-receiving portions of the core, thereafter admitting to the mold a casting metal consisting essentially of copper, rotating the barrier and core prior to the introduction of the molten metal to the core, and continuing such rotation at a substantial speed, at least until the core cavities are substantially filled with the molten metal.

12. The described method of forming a rotor or like unit for an electric machine, the unit being of a type characterized by a core with cast-in conductor bars and end rings, which consist in substantially assembling the core structure provided with peripheral bar-receiving slots, forming a substantially impervious lining within a mold structure over the portions thereof to be engaged by the conducting metal in casting, substantially evenly coating the bar-receiving portions of the core structure, with a refractory material, introducing to said portions a molten conducting metal containing copper in substantial amount and of a degree of purity to assure uniform conductivity, and rotating the core and mold at a substantial speed, at least from the time of beginning of pouring of the molten conducting metal, until the conducting metal cavities within the core and mold are substantially filled.

13. The described method of producing a rotor or like unit for an electric machine by a centrifugal casting process, which consists in building up a laminated core portion of the unit, characterized by peripheral bar-receiving slots, forming in each of said slots a sealing barrier of a material refractory in nature and virtually unaffected by contact with the molten conducting metal, forming a sealing barrier of a similar material in a manner substantially to confine a molten metal to spaces peripherally within the circumferential portions of the core, and to spaces endwise thereof to form the end rings, admitting to the mold a molten conducting metal which consists essentially of copper, and spinning the core and mold beginning at least with the time of introduction of the molten metal thereto, and continuing until the cavities of the mold and core are substantially filled with the conducting metal.

14. The described method of forming for an electric machine, a rotor or like unit of a type in which the conducting elements are cast as a single physical unit, in place in and on a core, the method consisting in applying to the core portions to be engaged by the cast metal, a barrier of refractory material, thereafter heating the core and thereby effecting at least a slight phase change in said refractory barrier, forming on the inner surfaces of a mold to contain the core during casting, a refractory barrier, heating the mold prior to casting, to an extent to cause the refractory thereon to undergo at least a slight phase change, introducing the refractory-treated core structure to the refractory-treated mold structure, admitting to the mold and to cavities within the core, a molten conducting metal which consists essentially of copper, and spinning the mold and core at least throughout the time of admission thereto of the molten conducting metal.

15. The described method of forming a rotor or like unit characterized by cast conducting elements, for use in an electric machine, which consists in the several steps as recited by the preceding claim and further characterized in that the refractory-treated portions of the mold are isolated from the molten conducting metal, in a step involving the addition to the interior mold surfaces of a talc of a somewhat impure form, sinterable in a temperature range below that of the molten casting metal, and the further step of preheating the mold, prior to admission of the casting metal, to an extent such as to effect sintering of talc barrier on the interior mold surfaces.

16. In the described process of forming a rotor or like unit characterized by cast conducting elements, and adapted for use in an electric machine, the step, practiced distinctly prior to pouring the casting metal, of fusing, at least surficially, a refractory on those surfaces of a builtup rotor core, to be engaged by the cast conducting elements of the core.

17. In the described process of forming a rotor or like unit characterized by a core and integrally cast conducting elements thereon, and adapted for use in an electric machine, the steps which consist in applying a refractory material to those portions of a builtup core adapted to engage the conducting elements, heating the core and refractory, prior to casting, to an extent effecting at least surficial fusion of the refractory, and in heating, prior to pouring the cast conducting metal, a refractory surface of a mold for use about the rotor to an extent to effect at least surficial fusion of a refractory portion to be engaged by the molten conducting metal.

18. The described method of casting copper windings for one element of an electric machine including a core, the method including the steps of melting by heating, a substantially iron-free copper, lining the mold and coating the core surfaces within the mold, with a silicate refractory and adhesively securing said refractory to the interiorly exposed mold surfaces, rapidly rotating the mold and contents, pouring the copper into the mold during rotation, continuing rotation of the mold until substantial freezing of the copper, reheating the mold and contents only to the point of loosening the cast windings and core from the mold, and removing the contents of the mold.

19. The method of casting copper windings in the rotor member of an electric machine, which comprises the steps of coating the faces and slots of a rotor core and the adjacent surfaces of a mold containing the core with a refractory material composed essentially of a silicate of magnesium, heating the mold and contents through a temperature range of the order of 1300–1900° F., thereby causing partial sintering of the refractory, admitting substantially pure molten copper to the mold, while the mold is at a temperature within the lower temperature range, and continuously rotating the heated mold and contents during the pouring of the molten copper and until substantial solidification of the copper mass.

20. In the described process of forming an element for an electric machine, which element is of a type characterized by cast conducting windings seated on a supporting core therefor, the step which consists, after pouring and freezing of the casting metal but while the element remains in assembly with a mold element, in reheating the mold and element to a temperature within a range substantially below that of the melting point of the cast conducting metal whereby to expand the mold element away from the cast conducting elements and releasing the mold from the cast core structure.

21. In the method of forming a bi-metallic rotor characterized by a peripherally slotted core and integrally cast conducting elements thereon, the steps which consist in applying a refractory material to the surfaces of the rotor core and slots, introducing the refractory-coated core to a mold formed to provide cavities at both ends of the rotor therein, fusing the refractory on the surfaces and in the slots of the core, pouring the molten casting metal endwise into the cavities formed by the mold, core and slots therein, and venting the cavities at each end of the mold throughout the pouring of the molten metal.

22. The method of forming a bi-metallic rotor unit, which consists in building up a laminated core portion of the rotor unit, characterized by peripheral bar-receiving slots, each slot having a restricted opening into the peripheral surface of the core, and extending substantially the length of the slot, the method including the steps of forming in each of the slots a sealing barrier of a refractory material, fusing the refractory material within the slots so that it is virtually unaffected by contact with the molten bar-forming casting metal, and pouring the molten casting metal into the slots, endwise thereof, so that a portion of the casting metal is extruded through the restricted portion of each of the slots to protect the bar-forming metal within the slots from contamination by the core metal.

23. The described method of casting a structural unit for electrical apparatus, which unit is of a type embodying a recessed body of a ferrous metal and other parts of spaced, cast, conducting elements occupying recessed portions of the body, which method consists in applying a thin coating of a refractory material to the surfaces and recesses of the body, in heating the refractory coated body to a degree to stabilize and integrate the refractory, in coating a metal mold element with a refractory, heating the coated mold element to render the refractory thereon substantially impervious, positioning the mold element and body in assembly for casting, in rotating the body, in admitting a substantially pure conducting metal to the body recesses during rotation, and in continuing rotation of the body until solidification of the conducting metal in the recesses.

24. The described method of casting a structural unit for electrical apparatus, in which a portion of the unit consists of spaced, cast, conducting elements, which method consists in pouring molten iron-free copper into a spinning mold containing a support for the conducting elements, adhesively lining the mold with a non-ferrous refractory, adhesively coating with a refractory the surfaces of the support to be engaged by the conducting elements, and spinning the mold substantially until the copper forming the conducting elements, is frozen throughout its mass.

25. The described method of casting a structural unit for electrical apparatus, in which a portion of the unit consists of spaced, cast, conducting elements, which method consists in surrounding a substantially assembled core structure by a mold, admitting to the mold a molten conducting metal which consists essentially of copper, confining said metal substantially throughout the mold cavities by a wall of a refractory material, and rotating the core and mold at a substantial speed at least until the mold cavities are filled with the conducting metal.

GORDON R. ANDERSON.